(12) United States Patent
Worley, Jr.

(10) Patent No.: US 7,509,644 B2
(45) Date of Patent: Mar. 24, 2009

(54) OPERATING SYSTEM CAPABLE OF SUPPORTING A CUSTOMIZED EXECUTION ENVIRONMENT

(75) Inventor: William S. Worley, Jr., Centennial, CO (US)

(73) Assignee: Secure 64 Software Corp., Greenwood Village, CO (US)

( * ) Notice: Subject to any disclaimer, the term of this patent is extended or adjusted under 35 U.S.C. 154(b) by 1011 days.

(21) Appl. No.: 10/789,783

(22) Filed: Feb. 27, 2004

(65) Prior Publication Data

US 2004/0177342 A1    Sep. 9, 2004

Related U.S. Application Data

(60) Provisional application No. 60/497,870, filed on Aug. 25, 2003, provisional application No. 60/451,848, filed on Mar. 4, 2003.

(51) Int. Cl.
G60F 9/46    (2006.01)

(52) U.S. Cl. .................................. 718/104; 713/164

(58) Field of Classification Search .................. 718/1, 718/100–108; 726/1–36; 713/1–601; 719/311–320, 719/328

See application file for complete search history.

(56) References Cited

U.S. PATENT DOCUMENTS

| | | | |
|---|---|---|---|
| 4,467,409 A | | 8/1984 | Potash et al. |
| 5,067,069 A | | 11/1991 | Fite et al. |
| 5,764,861 A | | 6/1998 | Priem et al. |
| 5,835,734 A | * | 11/1998 | Alkalaj et al. ............... 710/104 |
| 5,918,050 A | | 6/1999 | Rosenthal et al. |
| 6,470,442 B1 | * | 10/2002 | Arimilli et al. ............... 712/32 |
| 2002/0029301 A1 | * | 3/2002 | Toda ............................ 709/319 |
| 2002/0194389 A1 | | 12/2002 | Worley, Jr. et al. |
| 2003/0110205 A1 | * | 6/2003 | Johnson ....................... 709/104 |
| 2006/0031672 A1 | * | 2/2006 | Soltis et al. ................... 713/164 |

OTHER PUBLICATIONS

Isaacs, Rebecca et al. "Support for Resource-Assured and Dynamic Virtual Private Networks." IEEE. Mar. 2001.*
Author Unknown., "Itanium® Processor Family Performance Tuning Guide." pp. 1-49, 2003.
Author Unknown., "TCPA PC Specific Implementation Specification." Sep. 9, 2001.

(Continued)

*Primary Examiner*—Lewis A Bullock, Jr.
*Assistant Examiner*—Jue S Wang
(74) *Attorney, Agent, or Firm*—Olympic Patent Works PLLC (57) ABSTRACT

Operating system methods and techniques for supporting one or more custom execution environments ($CE^2$s) are provided. According to one embodiment, a determination is made with respect to which system resources of a computer system, if any, are to remain under control of a resident operating system of the computer system and which of the system resources are to be placed under control of one or more $CE^2$s. The system resources are then partitioned among the resident operating system and the one or more $CE^2$s by associating one or more partitions of the system resources with the one or more $CE^2$s. Such partitioning may be performed by the resident operating system by employing hardware-based isolation techniques provided by a processor of the computer system, performed by the resident operating system by employing a secure-platform interface, or configured by a system administrator via hardware partitioning capability provided by the computer system platform.

43 Claims, 6 Drawing Sheets

OTHER PUBLICATIONS

Carroll, A. et al., "Microsoft 'Palladium': A Business Overview Combining Microsoft Windows Features, Personal Computing Hardware, and Software Applications for Greater Security, Personal Privacy and System Integrity." Aug. 2002.

Huang, Andrew., "Keeping Secrets In Hardware: *The Microsoft XBox™ Case Study*." Aug. 13-15, 2005.

Lettice, John., "Inside Microsoft's Secure OS Project Palladium." The Register., Nov. 12, 2002.

Weinberg, Bill., "Rediscovering UNIX Reliability in Linux®—White Paper." MontaVista Software. 2001.

Witchel, E. et al., "Mondrian Memory Protection." MIT Laboratory for Computer Science, 2001.

* cited by examiner

Figure 1

|  | SGPOS | $C^2E^2_1$ | $C^2E^2_2$ |
|---|---|---|---|
| Processors | x | x | x |
| Banks/ranges of Memory | x | x | x |
| LAN Adapter Cards |  | x |  |
| Peripheral Devices and Associated Adapter Cards | x |  | x |
| Logical Resources (e.g., protection IDs) | x | x | x |

Figure 2A

|  | SGPOS | $C^2E^2_1$ | $C^2E^2_2$ |
|---|---|---|---|
| Processors |  | x | x |
| Banks/ranges of Memory | x | x | x |
| LAN Adapter Cards |  | x |  |
| Peripheral Devices and Associated Adapter Cards |  |  | x |
| Logical Resources (e.g., protection IDs) |  | x | x |

OPERATING SYSTEM CAPABLE OF SUPPORTING A CUSTOMIZED EXECUTION ENVIRONMENT

This application claims the benefit of U.S. Provisional Application No. 60/451,848 filed Mar. 4, 2003 and U.S. Provisional Application No. 60/497,870 filed Aug. 25, 2003, both of which are hereby incorporated by reference in their entirety.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright 2003-2004, Secure64 Software Corporation.

BACKGROUND

1. Field

Embodiments of the present invention generally relate to the field of operating systems. More particularly, embodiments of the present invention relate to enhancement of a general-purpose operating system to function as a symbiotic partner with one or more Customized Execution Environments ($CE^2$s).

2. Description and Shortcomings of the Related Art

The approach adopted by modern general-purpose operating systems has been to define and implement multiple levels of abstractions on top of the actual processor hardware. Such abstractions include multiple virtual memories, multiple tasks (a.k.a. processes or threads), files, sockets, interrupt handlers, semaphores, spin locks, time of day clocks, interval timers, etc.

Some of these abstractions are implemented in the kernels of the respective operating systems, which typically exercise complete control over the actual computational resources of a processor. Such kernels execute at the highest privilege level provided by the processor, enabling the programs comprised by the kernel to execute the "privileged instructions" of the processor instruction set. Operating system kernels manage the creation, scheduling, coordination, and destruction of instances of such abstractions. They also provide for appropriate handling of the entire range of synchronous and asynchronous faults, traps, aborts, and interruptions defined by the hardware processor architecture.

Control of integrated or plug-in input/output device control adapters are implemented by programs called drivers (a.k.a. I/O drivers or LAN drivers or <device> drivers, where <device> is a particular peripheral, bus, or function name). Such drivers also are permitted to execute at the highest privilege level provided by the processor. The amount of code comprised by the drivers usually is larger than the code for operating system kernels themselves.

Other elements implementing the abstractions are built on top of the operating system kernel and I/O drivers. These include file systems, network stacks, synchronization primitives, software signaling mechanisms, sockets interfaces, graphical user interfaces, and various libraries of system services. These elements combine with operating system kernels and I/O drivers to provide an interface to application programs that can be realized on many different hardware platforms.

Indeed, the primary purpose in defining the multiple levels of abstraction provided by general-purpose operating systems has been to develop application interfaces that can be implemented across systems employing incompatible processor and platform architectures. Such portability has been the summum bonum for operating systems. This has been true, in particular, for the UNIX, Linux, and Windows operating systems (ULW operating systems). To date, Linux has enjoyed great success in being ported to many incompatible hardware platforms.

While the program of defining and implementing the multiple layers of abstraction found in today's ULW operating systems has been successful in achieving portability, the result has not been achieved without performance penalties and other negative effects. Two primary such effects will be called the "lowest common denominator" effect and the "semantic mismatch" effect. The first of these effects has resulted in the inability of ULW operating systems to benefit from powerful capabilities present only on some processors. The latter effect manifests either in excessive performance overheads or in system-level functional deficiencies such as scalability and security.

Operating system portability, particularly in ULW systems, has in practice led to two basic categories of consensus. First, there is a broad consensus among the ULW systems as to which abstractions are supported. One cannot find, for example, significant differences among the virtual memory, process-thread-task, file, network, and interruption abstractions of the ULW systems. Second, there is a consensus as to which set of hardware capabilities are supported. This set of capabilities properly can be labeled the architectural "lowest common denominator."

In the mid 1960s, with the introduction of IBM's System/360, the operating system structure based upon two hardware-enforced levels of privilege was established. The operating system kernel (at the time called the "Nucleus") and other critical system control code executed at the high hardware privilege level. Other code, including application codes, executed at the low hardware privilege level.

Although several important instruction set architectures have offered four levels of hardware privilege the ULW operating systems never have supported four levels of privilege because such support could not run upon those processors still offering only two levels of hardware privilege. In fact, due to the hardware lowest common denominator effect, the ULW operating systems persist in supporting the 1960's privilege model, with some extensions for read, write, and execute privilege controls. The only truly significant change has been the explosive growth in the amount of code that now executes at the highest level of hardware privilege, a result neither intended nor foreseen by the IBM System/360 architects. Even more powerful addressing control capabilities, such as those offered by PA-RISC® and the Itanium® systems, remain entirely unused by ULW operating systems.

For highly secure systems, in particular, there is compelling need to use finer-grained memory protection capabilities, beyond those that are common to every manufacturer's processors. Support for such capabilities is simply unavailable from any of the principal general-purpose operating systems thereby making more difficult the construction of secure operating systems.

The first category of abstraction consensus provided by the ULW operating systems, like the lowest common denominator consensus regarding hardware features, also results in the collection of functional shortcomings we call the semantic mismatch effect. While the generally accepted operating system abstractions are suitable for a broad class of applications, they are not ideal in every case. No computing structure can be all things to all applications, but force-fitting all applications into solely the generally accepted abstractions is precisely the result of requiring that all applications operate within the ULW operating systems.

Some applications simply cannot work within the limitations of such constraints. Obvious examples are real-time applications, where the system must respond within strict time constraints. General-purpose operating systems usually provide parameters for tuning themselves for the best responses they are able to achieve. However, they cannot always meet the requirements of real-time applications. System designers have addressed such problems in various ways. Some have enveloped a general-purpose operating system within an underlying real-time kernel. In this structure, a real-time structure controls the applications that require guaranteed responsiveness, and the general-purpose operating system controls the rest. Other designers have chosen specialized real-time operating systems, and simply abandoned the attempt to use general-purpose operating systems.

Other applications can be made to function within general-purpose operating systems, but only at the cost of overheads that can substantially reduce system performance. The abstractions provided by the principal general-purpose operating systems are realized only by the expenditure of hardware cycles. The abstractions also have been found not to be low overhead constructs, particularly when considering scalability and security. Defensive validation of arguments is needed at many interfaces, to protect system integrity. Privilege layer crossings can require switching of software (and hardware) stacks. In Helen Custer's book describing the construction of Microsoft's first NT system there is a recurring theme of elegant levels of abstraction leading to unacceptable performance overheads, resulting in redesign and "fast-path" implementations. These occurrences were within the Windows operating system itself. The same syndrome can manifest itself at application levels, where the underlying abstractions offered by the operating system are not a close semantic fit with the needs of the application.

Consequently, if an application's objectives include maximum possible throughput, shortest possible response, and absence of security vulnerabilities the consensus abstractions of general-purpose operating systems can constitute impediments to meeting these objectives.

BRIEF DESCRIPTION OF THE SEVERAL VIEWS OF THE DRAWINGS

Embodiments of the present invention are illustrated by way of example, and not by way of limitation, in the figures of the accompanying drawings and in which like reference numerals refer to similar elements and in which.

SUMMARY

Operating system methods and techniques for supporting custom execution environments ($CE^2$s) are described. According to one embodiment, a determination is made with respect to which system resources of a computer system, if any, are to remain under control of a resident operating system of the computer system and which of the system resources are to be placed under control of one or more $CE^2$s. The system resources are then partitioned among the resident operating system and the one or more $CE^2$s by associating one or more partitions of the system resources with the one or more $CE^2$s.

Other features of embodiments of the present invention will be apparent from the accompanying drawings and from the detailed description that follows.

DETAILED DESCRIPTION

Methods and techniques for implementing a Symbiotic General-Purpose Operating System (SGPOS) are described. Broadly stated, embodiments of the present invention seek to provide a general-purpose operating system with the new abilities to initialize, support and/or coexist with one or more custom execution environments. Consequently, according to embodiments of the present invention a general-purpose operating system may be evolved into a SGPOS that enables it to offer a set of application software execution environments providing not only those abstractions supported by the general-purpose operating system itself, but also those offered by one or a plurality of custom execution environments ($CE^2$s) in which: (1) each $CE^2$ constitutes the execution environment for a single application, and exclusively manages a subset of the hardware resources allocated to it by the SGPOS; (2) the semantics within each $CE^2$ can be independent of, and are no longer limited by, the set of general-purpose abstractions provided by the general-purpose operating system; (3) the semantics within each $CE^2$ can be customized to the needs solely of the application to be executed within that environment; (4) the semantics within each $CE^2$ can achieve desired properties not readily achievable within the constraints of the abstractions provided by the general-purpose operating system itself, such as minimum computational overheads, linear multiprocessor scalability, and elimination of vulnerabilities to attacks against its integrity and security; (5) within a $CE^2$, full use can be made of available hardware capabilities, even if those capabilities are not directly supported by the general-purpose operating system; and (6) each $CE^2$ can be isolated and protected from access by any other $CE^2$ or from access by the SGPOS itself.

According to one embodiment, a SGPOS includes a means to partition system resources, a means to initialize and invoke a customized execution environment, a means to isolate the SGPOS and the customized execution environment and protect them from each other, a means to communicate between a partition of the system resources remaining under the control of the SGPOS and a partition of the system resources under the control of the customized execution environment, and a means to reincorporate system resources relinquished by the customized execution environment as it shuts down, and to return full control of reincorporated system resources to the SGPOS.

Once the system resources, such as processors, physical memory, storage devices, virtual memory identifier values, input/output (I/O) devices, and exception delivery, are partitioned into one or more partitions, the SGPOS may transfer full control of at least one of the partitions to a separate customized execution environment. The customized execution environment then has direct access and control over the system resources within its partition. That is, there are no operating system abstractions interposed between the customized execution environment and the system resources allocated to the customized execution environment. Advantageously, with the operating system abstractions out of the way, the customized execution environment may implement a computational and/or I/O structure that is simpler, is tuned for a particular application, and can take advantage of certain processor or other system resource features that are not exploited by the SGPOS.

Additionally, to the extent the SGPOS and the customized execution environment run concurrently within their respective partitions, the customized execution environment need not duplicate general-purpose capabilities already present in the SGPOS, but rather may focus solely upon the software structure best suited to its specific application. It then can obtain general-purpose services by communicating with the SGPOS. For example, the customized execution environment may obtain system administration, control of peripheral devices outside of its partition, system boot and configuration initialization, partitioning of system resources, non-critical operating system services, and services supplied by a user application running under the SGPOS, etc. from the SGPOS via a communication channel maintained between the partitions of the SGPOS and the customized execution environment.

In the following description, for the purposes of explanation, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by operator configuration, hardware components, or may be embodied in machine-executable instructions, which may be used to cause a general-purpose or special-purpose processor programmed with the instructions to perform the steps. Alternatively, the steps may be performed by a combination of operator configuration, hardware, software, and/or firmware.

Embodiments of the present invention may be provided as a computer program product, which may include a machine-readable medium having stored thereon instructions that are used to program a computer (or other electronic devices) to perform a process. The machine-readable medium may include, but is not limited to, magnetic disks, floppy diskettes, optical disks, compact disc read-only memories (CD-ROMs, CD-Rs, CD-k Ws), digital versatile disks (DVD-ROM, DVD+RW), and magneto-optical disks, ROMs, random access memories (RAMs), erasable programmable read-only memories (EPROMs), electrically erasable programmabLe read-only memories (EEPROMs), magnetic or optical cards, and flash memory. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

Terminology

Brief definitions of terms and phrases used throughout this application are given below.

The terms "connected" or "coupled" and related terms are used in an operational sense and are not necessarily limited to a direct physical connection or coupling.

The phrase "Concurrent Customized Execution Environment" or "$C^2E^2$" generally refers to a Customized Execution Environment that coexists with a general-purpose operating system and shares at least a means of communication with the general-purpose operating system.

The phase "Customized Execution Environment" or "$CE^2$" refers to a customized operating environment itself, in which there is provided a set of system services implemented in software having direct access and full control over a portion of system resources. $CE^2$s are quite distinct from an operating system or specialized operating system and are characterized by:

1. A $CE^2$ comprises both statically linked system code and data modules and application code and data modules;
2. A $CE^2$ lacks the capability to load or to load and execute any other application;
3. The functional capabilities of a $CE^2$ are limited to only those services required by a particular application or small set of predetermined applications;
4. A $CE^2$ falls far short of the capabilities expected of an operating system; specifically, applications are limited to a single thread of execution on each of one or more processors controlled by the $CE^2$;
5. The services interfaces of a $CE^2$ are simple and specialized for each of one or a small set of particular applications, rather than being comprised by a more complex and general Application Programming Interface (API) for a broad class of applications;
6. A $CE^2$ utilizes hardware capabilities not supported by a general-purpose or symbiotic general-purpose operating system;
7. A $CE^2$ makes substantial use of hardware capabilities not well utilized by a general-purpose or symbiotic general-purpose operating system;
8. The services provided to the application within a $CE^2$ are designed to enable an application far more easily to recover and continue from a system error and may be additionally characterized by:
9. Management strategies for system resources differ from those strategies adopted by traditional general-purpose operating systems;

According to one embodiment of the present invention, a general-purpose operating system at least temporarily relinquishes control of all or a portion of system resources associated with a computer system to one or more $CE^2$s. According to another embodiment, a $CE^2$ may be booted on hardware directly. For example, a general-purpose operating system may launch a $CE^2$ without ever taking control over the portion of system resources to be controlled by the $CE^2$. In still another embodiment, both the general-purpose operating system and one or more $CE^2$ may be booted into distinct hardware partitions such as those provided in the Hewlett Packard Superdome platform. $CE^2$s are typically specialized for a particular hardware platform. According to one embodiment, a $CE^2$ is non-portable and there are no general-purpose operating system abstractions interposed between the customized execution environment and the system resources allocated to the customized execution environment. Typically, system services provided by a $CE^2$ will implement a simplified computational structure and/or an I/O structure that are tuned for a particular application. For example, a $CE^2$ may take advantage of certain processor or other system resource features that are not exploited by the general-purpose operating system. According to one embodiment, a tuned $CE^2$ is provided to support a web edge engine, such as a web server, secure web server, proxy server, secure proxy server or other application or communication servers, to allow the web edge engine to drive the utilization of network connections as close as possible to 100%.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The phrase "principal general-purpose operating systems" generally refers to current and future versions of the UNIX, Linux, and Windows operating systems.

The phrase "Symbiotic General-Purpose Operating System" or "SGPOS" generally refers to an operating system, such as one of the principal general-purpose operating systems, which has been enhanced to include one or more of the following capabilities: (1) a mechanism to manage the resources of a computer system in cooperative partnership with one or more $CE^2$s; (2) a mechanism to partition/compartmentalize system resources and transfer control of one or more partitions of system resources, including processors, physical memory and storage devices, virtual memory identifier values, I/O devices, and/or exception delivery, to one or more $CE^{2s}$; and (3) a mechanism to allow communications between partitions of systems resources. SGPOSs might remain portable or could become specialized for a particular hardware platform.

The term "responsive" includes completely or partially responsive.

The phrase "system resources" generally refers, individually or collectively, to computational resources and/or other resources of a computer system, such as processors, physical memory, storage devices, virtual memory identifier values, input/output (I/O) devices, exception delivery and the like.

The phrases "web engine" and "web edge engine" generally refer to hardware, firmware and/or software that support one or more web protocols.

The phrase "web protocols" generally refers to current and future application layer networking protocols, including, but not limited to HyperText Transfer Protocol (HTTP), Secure HTTP (S-HTTP), Secure Sockets Layer (SSL), Transport Control Protocol (TCP), Internet Protocol (IP), Transport Layer Security (TLS), Extensible Markup Language (XML), Simple Object Access Protocol (SOAP), Universal Description, Discovery, and Integration (UDDI), DHTTP, HTTP/NG, File Transfer Protocol (FTP), Trivial File Transfer Protocol (TFTP), Common Open Policy Service (COPS), Flow Attribute Notification Protocol (FANP), Finger User Information Protocol, Internet Message Access Protocol rev 4 (IMAP4), IP Device Control (IPCD), Internet Message Access Protocol version 4rev1 (ISAKMP), Network Time Protocol (NTP), Post Office Protocol version 3 (POP3), Radius, Remote Login (RLOGIN), Real-time Streaming Protocol (RTSP), Stream Control Transmission Protocol (SCTP), Service Location Protocol (SLP), SMTP—Simple Mail Transfer Protocol (SMTP), Simple Network Management Protocol (SNMP), SOCKS, TACACS+, TELNET, and Web Cache Coordination Protocol (WCCP).

The phrase "web resource" generally refers to a network data object or service that can be identified by a Universal Resource Identifier (URI).

The phrase "web server" generally refers to hardware, firmware and/or software that supports one or more web protocols and serves web resources, such as web pages and the output of web applications, to web users. Examples of currently available web servers include Apache available from The Apache Software Foundation; Zeus Web Server available from Zeus Technology with offices in Cambridge, UK and Santa Clara, Calif.; Microsoft's Internet Information Server (IIS); Novell's Web Server; and IBM's family of Lotus Domino servers.

Overview

Secure64™ web edge engines seek to offer the world's best performance and the world's best security. Secure64 web edge engines will scale seamlessly from appliances employing single or dual processors, to full web servers employing hundreds of processors and concurrently executing customer applications and dynamic content generators. Advanced content acceleration and cryptographic security and privacy protections will be provided throughout the product line.

Secure64 web edge engines will support a wide range of current and future web protocols. While for convenience, embodiments of the present invention are described herein with reference to exemplary web edge engines, such as application servers, web servers and proxy servers, the enabling technologies described herein are broad based, and widely applicable to a variety of other network products, including, but not limited to: content accelerators, caching accelerators, firewalls, smart routers, filters, gateways, firewalls, and tunnels. (SECURE64 is a trademark of Secure64 Software Corporation of Englewood, Colo.).

According to one embodiment, a feature employed by the Secure64 web edge engines to address one or more shortcomings of the principal general-purpose operating systems is the enhancement of an operating system to function as a symbiotic partner with one or more $CE^2$s. In this manner, the design of each $CE^2$ may focus upon the simplest means of system control, minimal computational overheads, and the strongest security structure for its particular application, e.g., content acceleration, caching acceleration, routing, protocol translation, tunneling, serving web content, etc.

Figure 1:
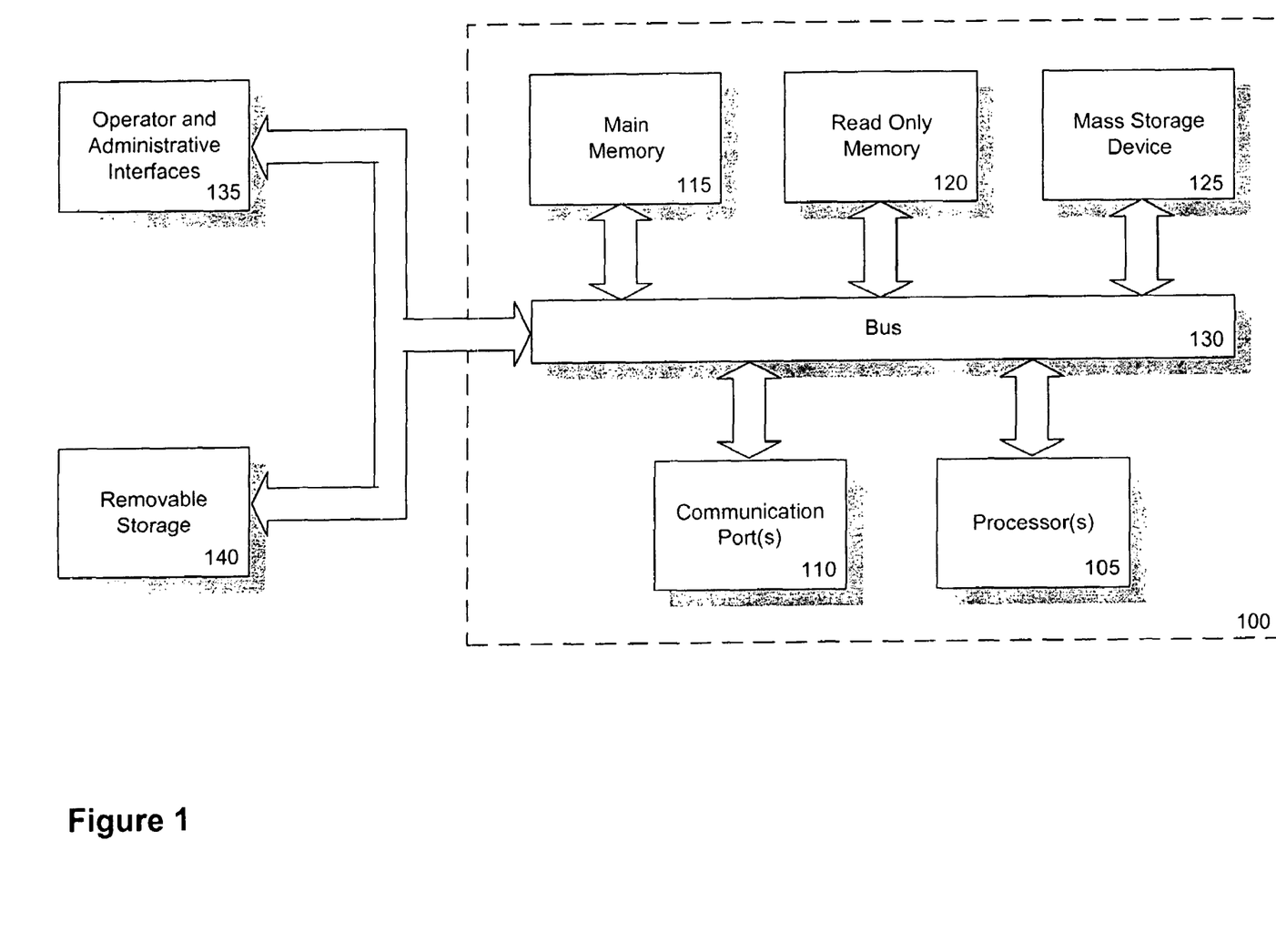
FIG. 1 is an example of a computer system with which embodiments of the present invention may be utilized.

An exemplary computer system 100, representing an exemplary server, such as a 2-way HP Server rx1600, a 4-way HP Server rx5670, an HP Server rx2600, or the like, with which various features of the present invention may be utilized, will now be described with reference to FIG. 1. In this simplified example, the computer system 100 comprises a bus 130 or other communication means for communicating data and control information, and one or more processors 105, such as Intel® Itanium® or Itanium 2 processors, coupled with bus 130.

Computer system 100 further comprises a random access memory (RAM) or other dynamic storage device (referred to as main memory 115), coupled to bus 130 for storing information and instructions to be executed by processor(s) 105. Main memory 115 also may be used for storing temporary variables or other intermediate information during execution of instructions by processor(s) 115. According to various embodiments of the present invention, main memory 115 may be partitioned via a region-identifier-based memory partitioning mechanism. The resulting partitions may be assigned to one or more processors for exclusive access by such processors using a hardware-based isolation mechanism, such as associating areas of memory with protection keys.

Computer system 100 also comprises a read only memory (ROM) 120 and/or other static storage device coupled to bus 130 for storing static information, such as cryptographic digital signatures associated with initial code and data images of one or more $CE^2$s, customized applications, and operating system, and instructions for processor(s) 105.

A mass storage device 125, such as a magnetic disk or optical disc and its corresponding drive, may also be coupled to bus 130 for storing information and instructions, such as an operating system loader, an operating system, one or more customized applications and associated $CE^2$s, initialization files, etc.

One or more communication ports 110 may also be coupled to bus 130 for supporting network connections and communication of information to/from the computer system 100 by way of a Local Area Network (LAN), Wide Area Network (WAN), the Internet, or the public switched telephone network (PSTN), for example. The communication ports 110 may include various combinations of well-known interfaces, such as one or more modems to provide dial up capability, one or more 10/100 Ethernet ports, one or more Gigabit Ethernet ports (fiber and/or copper), one or more network protocol offload boards, or other well-known network interfaces commonly used in internetwork environments. In any event, in this manner, the computer system 100 may be coupled to a number of other network devices, clients, and/or servers via a conventional network infrastructure, such as an enterprise's Intranet and/or the Internet, for example.

Optionally, operator and administrative interfaces 135, such as a display, keyboard, and a cursor control device, may also be coupled to bus 130 to support direct operator interaction with computer system 100. Other operator and administrative interfaces can be provided through network connections connected through communication ports 110.

Finally, removable storage media 140, such as one or more external or removable hard drives, tapes, floppy disks, magneto-optical discs, compact disk-read-only memories (CD-ROMS), compact disk writable memories (CD-R, CD-RW), digital versatile discs or digital video discs (DVDs) (e.g., DVD-ROMs and DVD+RW), Zip disks, or USB memory devices, e.g., thumb drives or flash cards, may be coupled to bus 130 via corresponding drives, ports or slots.

Figure 2A:
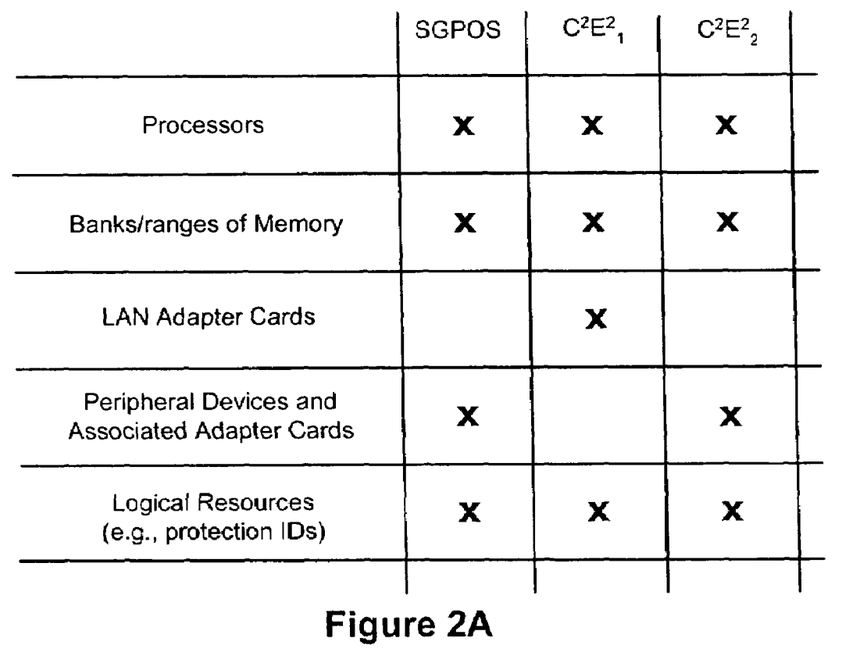
FIGS. 2A and 2B conceptually illustrate partitioning of system resources.
Figure 2B:
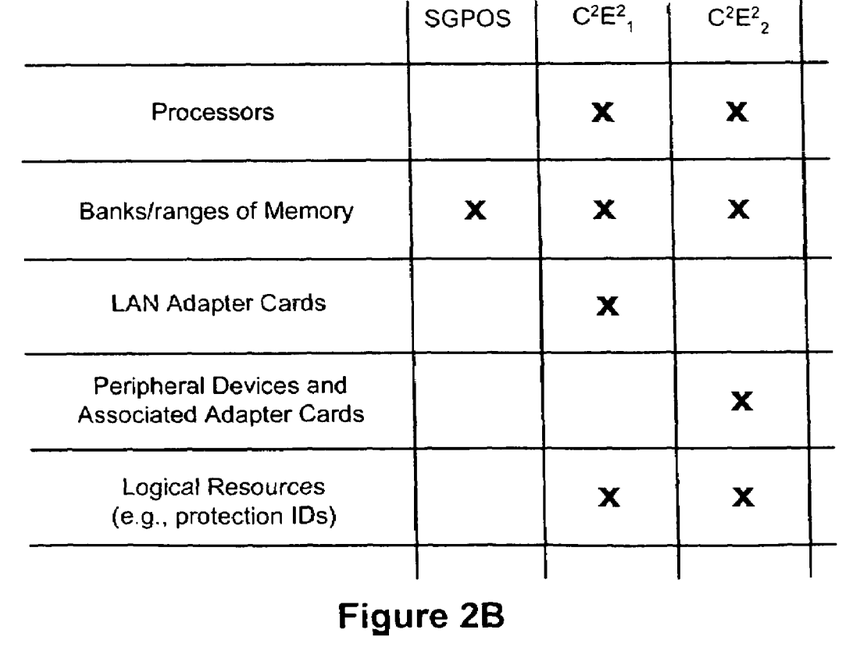

FIGS. 2A and 2B conceptually illustrate partitioning of system resources. In the tabular examples depicted, the rows represent exemplary hardware resources, the columns represent operating environments, and the Xs identify to which operating environment a particular hardware resource or portion of such resources are allocated. Collectively, the Xs in a particular column represent the partition of system resources allocated to the corresponding operating environment.

According to the partitioning of system resources depicted in FIG. 2A, the SGPOS has been allocated one or more processor units, one or more banks/ranges of memory, one or more peripheral devices and associated adapter cards and one or more sets of logical resources. That is, a partition of system resources comprising the aforementioned lists of resources has been identified for the exclusive use of the SGPOS. Similarly, in this example, a partition of system resources comprising one or more processor units, one or more banks/ranges of memory, one or more LAN adapter cards and one or more sets of logical resources has been identified and allocated for the exclusive use of the $C^2E^2{}_1$. Finally, the $C^2E^2{}_2$ has been allocated for its exclusive use and management, one or more processor units, one or more banks/ranges of memory, one or more peripheral devices and associated adapter cards, and one or more sets of logical resources.

While in the simple partitioning examples depicted, a particular type of hardware resource may be allocated to more than one operating environment, there is no requirement that such resources be divided equally. For example, in FIG. 2A, an X in the Processors row for each of the SGPOS, $C^2E^2{}_1$, and $C^2E^2{}_2$ columns indicates at least one processor unit (typically a whole processor) is partitioned or allocated to that particular operating environment, but the number of processor units partitioned to each operating environment is independent of the number partitioned to the others except for the fact that all of the operating environments are drawing from the same limited pool of available hardware resources.

Similarly, there is no requirement that system resources be divided into uniform or equally provisioned partitions with respect to any individual system resource or collection of system resources. Additionally, the partitions may be static or dynamic. The number and/or type of logical and physical system resources associated with a particular partition may be dynamically reallocated to address needs of the $CE^2$s or SGPOS or in response to the launching of a new $CE^2$ or termination of an existing $CE^2$, as examples.

At this point, it is convenient to discuss various hardware isolation mechanisms that may be employed to protect the partition of system resources allocated to one operating environment from access by another operating environment. Processors in the future are expected to provide hardware-based isolation techniques that will be employed by the SGPOS and/or $CE^2$s. Until such hardware-based full-isolation technology is available, however, partitions of system resources allocated to $CE^2$s may be protected from the resident operating system by quiescing the operating system and placing it in a dormant state (in which it is not running anything and utilizes only a minimum set of system resources to allow it to be reactivated). Then, if desired, one or more existing protection mechanisms, such as protection-key-based memory partitions, region identifier allocation, protection identifier allocation, memory page access rights values, may be employed to enforce partition security among and/or within $CE^2$s.

Alternatively, the resident operating system may remain active and a secure-platform interface may be employed to provide the desired level of isolation among partitions, such as the combined-hardware-and-software secure-platform interface described in U.S. patent application No. 10/118,646 entitled "Secure Machine Platform that Interfaces to Operating Systems and Customized Control Programs" published on Dec. 19, 2002 as Publication No. 2002/0194389 A1, (the "'646 application") which is hereby incorporated by reference in its entirety.

Hardware partitioning capabilities, such as those provided by the HP Superdome platform provide still a third alternative to effect full isolation among partitions. With these means partitions may be statically configured by a system administrator, rather than be constructed dynamically by the SGPOS. Although the partitions are less readily modified, the isolation can be fully enforced by hardware.

The partitioning of system resources depicted in FIG. 2B, is representative of a particular state of system resource allocation in which the SGPOS is dormant. Since the SGPOS has no processor units allocated to it, it cannot be running any processes. Other system resource allocation configurations are also consistent with the SGPOS being dormant. For example, when no system resources are allocated to the SGPOS (when the SGPOS column is empty), the SGPOS is dormant and one or more $CE^2(s)$ would have exclusive control and management of the system resources. Conversely, when the columns associated with the $C^2E^2(s)$ are empty, such as during boot processing or after termination of the $C^2E^2(s)$ and release of their partitions back to the SGPOS, then the SGPOS has exclusive control and management of the system resources.

Figure 3:
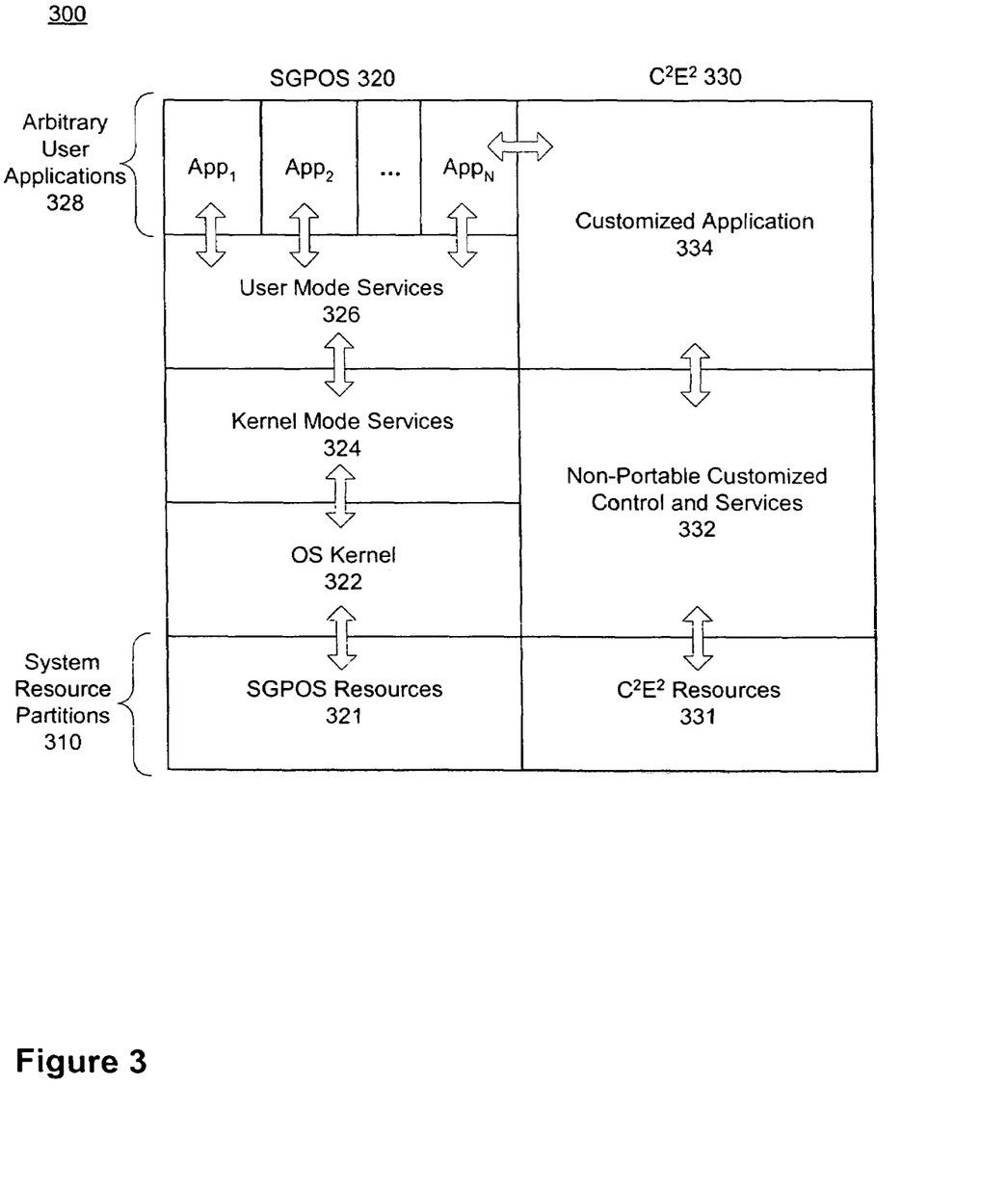
FIG. 3 conceptually illustrates the relationships among an SGPOS, system resources, and $C^2E^2$s according to one embodiment of the present invention.

FIG. 3 conceptually illustrates relationships among an SGPOS 320, system resource partitions 310, and a $C^2E^2$ 330 according to one embodiment of the present invention. Briefly, embodiments of the present invention support the creation of a secure operating environment that is separate and distinct from the resident operating system. In multi-partition configurations, a portion of system resources is assigned to the secure operating environment and placed under its direct and exclusive control. Remaining portions of the system resources may be assigned to one or more other secure operating environments and/or retained by the resident operating system. In single-partition configurations, the resident operating system may surrender control of substantially all of the system resources of a computer system and place them under the full control of a secure operating environment.

In the example depicted, a computer system 300 is conceptually illustrated after partitioning and allocation of its resources into two system resource partitions 310, i.e., SGPOS resources 321 and $C^2E^2$ resources 331. While for ease of discussion and simplicity only two partitions of system resources are illustrated, it is to be understood that embodiments of the present invention are equally applicable to an arbitrary number of partitions allocated to an arbitrary number of SGPOSs and/or $CE^2s$. Additionally, while each column could comprise multiple possibly mutually isolated partitions, for purposes of this discussion, each column will be discussed as if it were a single partition.

According to the conceptual embodiment depicted, the vertical double-ended arrows represent communications between layers within a partition (e.g., intra-partition communications) while the horizontal double-ended arrows represent means of communication between the partitions (i.e., inter-partition communications). Depending upon the needs of the particular applications being supported, the means of communication provided for inter-partition communications may allow communications (1) among all partitions, (2) strictly between partitions remaining under the control of the SGPOS 320 and partitions under control of a $CE^2$, such as $C^2E^2$ 330, or (3) controlled according to other criteria. While the inter-partition communications is illustrated in the present embodiment as taking place between applications, it is worth noting that such communications may involve or be via services provided by the SGPOS Kernel Mode Services 324 and services provided by the non-portable customized control and services 332.

In any event, such inter-partition communication may be employed for multiple purposes, including system initialization, configuration, and control; system debugging and monitoring; communication with network control and monitoring systems such as HP's OpenView or IBM's Tivoli; invocation of operating system, application (e.g., user application or customized application), or $CE^2$ services from a different environment; and shifting the allocation of hardware and/or logical resources among $CE^2(s)$ and/or the SGPOS 320. Inter-partition communications may be implemented by various well-known techniques, such as: shared virtual memory, shared one-way virtual memories (one environment only can write; the other only can read), remote procedure call, software interruptions, and internal messages.

The simplified conceptual representation depicted in FIG. 3 is illustrative of the multiple levels of abstractions that are typically logically interposed between applications, such as arbitrary user applications 328, and the underlying system resources, such as SGPOS resources 321, in conventional operating systems, such as the ULW operating systems. Abstractions, such as virtual memories, tasks, files and file systems, sockets and sockets interfaces, network stacks, etc., implemented by user mode services 326, kernel mode services 324 and OS kernel 322, are a significant contributing factor to unacceptably high overhead for performance-critical applications, such as high performance web engines.

In contrast, $CE^2s$, such as $C^2E^2$ 330, because they are not limited to portability constraints imposed on general-purpose operating systems, may avoid consensus high overhead constructs and abstractions in favor of implementing computational and/or I/O structure that are simplified and optimized for a particular hardware platform and/or application. For example, the non-portable customized control and services 332 offered by $C^2E^2$ 330 may directly control $C^2E^2$ resources 331, the underlying system resources 310 allocated for exclusive use and control by $C^2E^2$ 330, and may take advantage of certain processor or other system resource features that are not exploited by the SGPOS 320.

Further efficiencies can be achieved on behalf of $CE^2s$, such as $C^2E^2$ 330, by excluding general-purpose capabilities, such as system administration, system boot and configuration initialization, and partitioning of system resources, and generation of web content that are already present in the SGPOS 320; and the $C^2E^2s$ may rely on the SGPOS to provide such general-purpose capabilities.

While in this example, the system resource partitions 310, i.e., SGPOS resources 321 and $C^2E^2$ resources 331, are depicted as equal sized boxes, potentially implying identical characteristics, there is no requirement that the system resources of the computer system 300 be divided into uniform or equally provisioned partitions with respect to any individual system resource or collection of system resources. For example, one partition may include X processors, Y MB of physical memory, and Z I/O devices while another partition may include R processors, S KB of physical memory, and T I/O devices. Additionally, the system resource partitions 310 may be static or dynamic.

Figure 4:
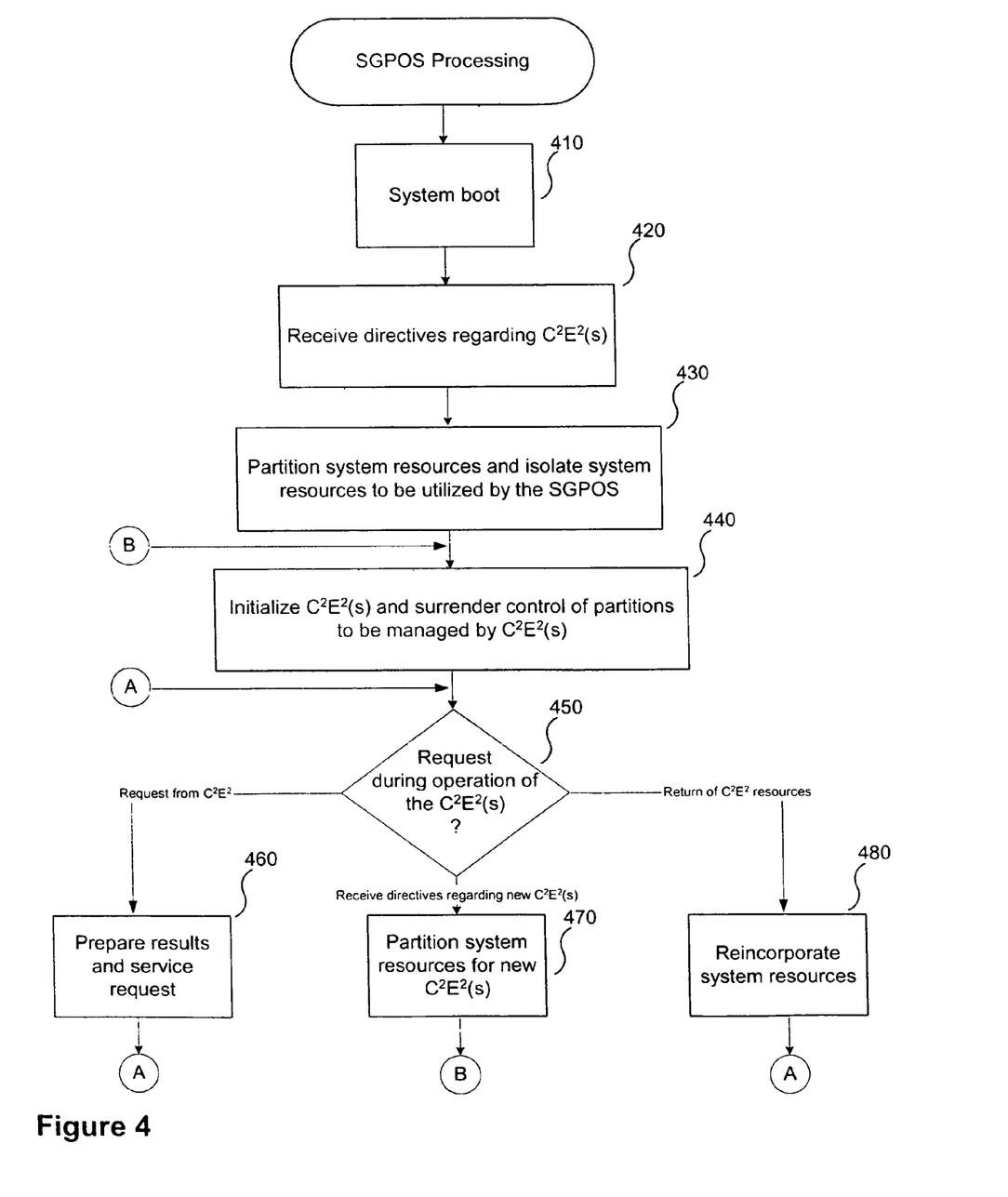
FIG. 4 is a simplified flow diagram conceptually illustrating SGPOS boot processing, $C^2E^2$ initialization, and SGPOS processing according to one embodiment of the present invention.

FIG. 4 is a flow diagram illustrating SGPOS processing according to one embodiment of the present invention. In this example, the SGPOS includes means to mange the system resources of a computer system in cooperative partnership with one or more $CE^2s$. The SGPOS also includes means to partition system resources, including, but not limited to, processors, physical memory and storage devices, virtual memory identifier values, I/O devices, and exception delivery. These means also cover the case in which all or substantially all system resources are transferred to one or more $CE^2s$. In this case, the SGPOS remains in a state of passivity until such time as a $CE^2$ returns control of a partition of resources to the SGPOS.

The SGPOS further includes means to initialize and invoke a $CE^2$, to inform the $CE^2$ of the system resources and/or system management duties being placed under its direct and full control, and to employ hardware isolation and protection mechanisms to protect the SGPOS environment from $CE^2s$. For a secure system, these means also include the ability to extend a chain of trust into the $CE^2s$, by validating the initial code and data images of the $CE^2s$, associated non-portable customized control and services, and customized applications, using cryptographic digital signatures.

No current general-purpose operating system provides the above capabilities. Existing operating systems have been built under the assumption that complete control of the system resources never passes from the direct control of the kernel. While virtual machine systems virtualize the resources the general-purpose operating system believes to be under its control, virtual machine kernels retain full control over the actual system resources, and therefore lack the ability to act as a symbiotic partner with a $CE^2$.

According to the embodiment depicted, the SGPOS processing generally breaks down into a pre-$CE^2$ stage (before any $CE^2$s are operational) and a $CE^2$ operational stage (during which at least one $CE^2$ is running and retains control of a portion of system resources). The pre-$CE^2$ stage is represented by blocks 410 through 440 and the $CE^2$ operational stage is represented by a loop among blocks 440 through 480. Briefly, the pre-$CE^2$ stage involves allocating available system resources among the SGPOS and one or more $CE^2$s and launching the one or more $CE^2$s. During the $CE^2$ operational stage, the SGPOS (1) responds to requests from the one or more $CE^2$s, (2) potentially reallocates system resources, initializes and launches new or reestablished $CE^2$s, and (3) reincorporates system resources relinquished by $CE^2$s.

SGPOS processing commences at block 410 where system boot is performed. System boot processing typically includes performing processor self-test routines and executing firmware instructions stored in a ROM to cause an operating system loader program to be read from a mass storage device and executed. The system boot process may be a normal boot in which the SGPOS relinquishes a subset of system resources or all system resources to one or more $CE^2$s. Alternatively, the system boot process may be a partial boot in which the SGPOS never obtains control over system resources to be controlled by the $CE^2$s.

According to one embodiment, the SGPOS and one or more $CE^2$s are part of a secure system. In a secure system, it is important to know that the software image controlling the system resources is complete, correct, and has not been subjected to any alteration or other form of tampering. Consequently, in such an embodiment, the system boot is a secure boot process to support the extension of a chain of trust into the $CE^2$s.

In the future, it is expected that computer systems will offer the capability to boot securely. One way this can be done is described in the '646 application. FIG. 19 of the '646 application illustrates a secure boot process based upon digital signatures. The initial firmware image digital signature is validated by hardware. The digital signature of each subsequent firmware or software image is validated by its preceding firmware or software image before control is passed to that subsequent image. In this manner, a chain of trust can be constructed, rooted in the initial firmware image, and extending through every image of firmware, operating system software, and application software.

At block 420, the SGPOS receives information regarding one or more $C^2E^2$s that are to receive control of a portion of the system resources. For example, the SGPOS may read an initialization file or partition descriptor that identifies the desired allocation of system resources and the code images of non-portable customized control and services for the one or more $C^2E^2$s. Alternatively, the partition descriptor information may be provided by way of operator directives. In the context of a secure system, at this point in the SGPOS processing, the images for the $C^2E^2$s and associated non-portable customized control and services may be loaded and authenticated by validating the digital signatures of the software images.

At block 430, the SGPOS partitions system resources in accordance with the partition descriptor and then isolates those of the system resources that are to remain under its control to protect the SGPOS resources, if any, from the $C^2E^2(s)$. In practice, it is expected that an entire processor will be the minimum unit of partitioning with respect to processing resources of a computer system. Consequently, individual microprocessors normally would be controlled either completely by the SGPOS or by a $C^2E^2$, but finer grained control of an individual processor is possible at a higher computational cost of switching between environments.

According to one embodiment, the SGPOS provides interrupt handlers for all interrupt requests originating from within its partition. Based on the system resources retained by the SGPOS, the SGPOS may disable interrupts, update appropriate interrupt vectors, and then enable interrupts. For example, interrupt vectors associated with external interrupt requests corresponding to hardware system resources partitioned to the SGPOS may be updated in the interrupt vector table to identify an address of an appropriate interrupt handler routine in the SGPOS's partition, while interrupt vectors associated with external interrupt requests corresponding to hardware system resources partitioned to a $CE^2$ may be masked or otherwise temporarily disabled until the $CE^2$ makes appropriate changes to the interrupt vector table to direct such interrupt requests to an appropriate handler routine in its partition.

The SGPOS may also reconfigure I/O. According to one embodiment, such reconfiguration includes forming appropriate associations between reserved areas of main memory in the SGPOS partition with memory-mapped I/O devices in the SGPOS partition. For example, a network device may be reconfigured so that data written to the device via a reserved area of main memory addresses is copied by memory mapping hardware to corresponding device controller memory addresses, and data read from the device via a reserved areas of main memory addresses is loaded into designated processor registers by the memory mapping hardware. Similar I/O reconfiguration may be performed by the $CE^2(s)$ during their initialization processing.

According to one embodiment, isolation of the system resources to be retained by the SGPOS may be achieved by utilizing one or more of the hardware or software isolation and protection capabilities discussed earlier, such as quiescing the SGPOS, employing a secure-platform interface, or utilizing hardware platform partitioning.

Regardless of the protection mechanism employed, in this example, before invoking the $C^2E^2(s)$, the SGPOS fences off memory resources and other system resources that are to be used exclusively by the SGPOS or otherwise limits access to such system resources. The $C^2E^2(s)$ may do the same during their initialization processing. Existing hardware isolation mechanisms are known not to be sufficient fully to protect partitions of system resources allocated to $C^2E^2$s from the resident operating system, but remain viable for protection within or among $C^2E^2$s. However, as noted above, in embodiments in which system resources are allocated only among one or more $C^2E^2(s)$, in which the SGPOS is placed in a state of passivity, one or more current or future protection mechanisms, such as the advanced memory protection architectures provided by Hewlett-Packard's PA-RISC and IA-64 systems, or similar security technologies, may be employed to secure partitions within or among $C^2E^2$s. In such embodiments, for example, before entering a state of passivity, the SGPOS may allocate physical memory and sets of region identifiers to the $CE^2$(s) and set memory attributes accordingly to associate the regions of memory with the corresponding system resources that are to be placed under the control of the $CE^2$(s).

Typically, memory will be partitioned into pages (i.e., memory pages). A memory page is a basic unit of memory with respect to I/O operations, virtual-memory-to-physical-memory mapping, isolation and protection attributes, and other types of operating system activities. In the IA-64 embodiment, exclusive domains may be enforced with region identifier and protection-key-based memory partitions. Using one or more of region identifier allocation, protection identifier allocation, memory page access rights values, and protection-key-based memory partitions, particular virtually addressed areas of memory, such as groups of discontiguous or contiguous memory pages, can be effectively associated with one or more processors that are to be placed under the control of one or more $CE^2$s. According to another embodiment, memory protection domains may be implemented as described in Witchel et al., "Mondrian Memory Protection", October 2002, ASPLOS-X, Tenth International Conference on Architectural Support for Programming Languages and Operating Systems.

Returning to the flow diagram of the present embodiment, once the system resources are partitioned and the SGPOS has been appropriately isolated, at block 440, the SGPOS transfers full control of one partition of system resources to a $C^2E^2$ by invoking the $C^2E^2$ and communicating to the $C^2E^2$ the system resources being placed under its control. According to this example, it is the $C^2E^2$'s responsibility to appropriately secure its own partition by isolating itself from the SGPOS and other $C^2E^2$s that may concurrently run within other system resource partitions.

At this point, one or more $C^2E^2$s are operating and processing loops among blocks 440 through 480 until all $C^2E^2$s terminate and SGPOS processing is terminated. Recall, according to one embodiment, the SGPOS may be placed in a dormant state after it has initialized and launched one or more $CE^2$s. In the present embodiment however, after initializing and launching one or more $C^2E^2$s, the SGPOS continues to decision block 450 and remains responsive to $C^2E^2$ and operator requests.

At decision block 450, the SGPOS determines that nature of an outside request (e.g., one originated by a $C^2E^2$ or an operator) and initiates appropriate processing in response thereto. The mechanism for being made aware of the existence of such requests may be via polling, interrupts, software signals or other appropriate signaling means, and the mechanism for receiving such requests may be via an internal messaging interface, an external interface (e.g., for web protocol requests relating to dynamic content), a communication interface, internal RPC, etc. At any rate, according to the embodiment depicted, there are three general types of requests that are handled during the $C^2E^2$ operational stage, i.e., a request from a $C^2E^2$, an operator directive to launch a new $C^2E^2$ or reestablish a $C^2E^2$, and a return of $C^2E^2$ resources. If the SGPOS determines a request from a $C^2E^2$ has been received, processing continues with block 460. If the SGPOS determines an operator directive to launch a new $C^2E^2$ or reestablish a $C^2E^2$ has been received, then processing continues with block 470. If the SGPOS determines a $C^2E^2$ is returning system resources, then processing continues with block 480.

At block 460, in response to a request from a $C^2E^2$, the SGPOS prepares the results and services the request by posting the results where the $C^2E^2$ can access them.

At block 470, in response to a request to receipt of directives relating to launching of a new $C^2E^2$ or reestablishing a former $C^2E^2$, the SGPOS allocates system resources for the new $C^2E^2$ and then proceeds to block 440.

At block 480, in response to return of system resources initiated by a $C^2E^2$, the SGPOS, with the cooperation of the $C^2E^2$, reincorporates the system resources into those under its control. For example, the SGPOS and $C^2E^2$ may reintegrate interrupts and pass responsibility for subsequent management of I/O devices to the SGPOS by reconfiguring I/O.

Figure 5:
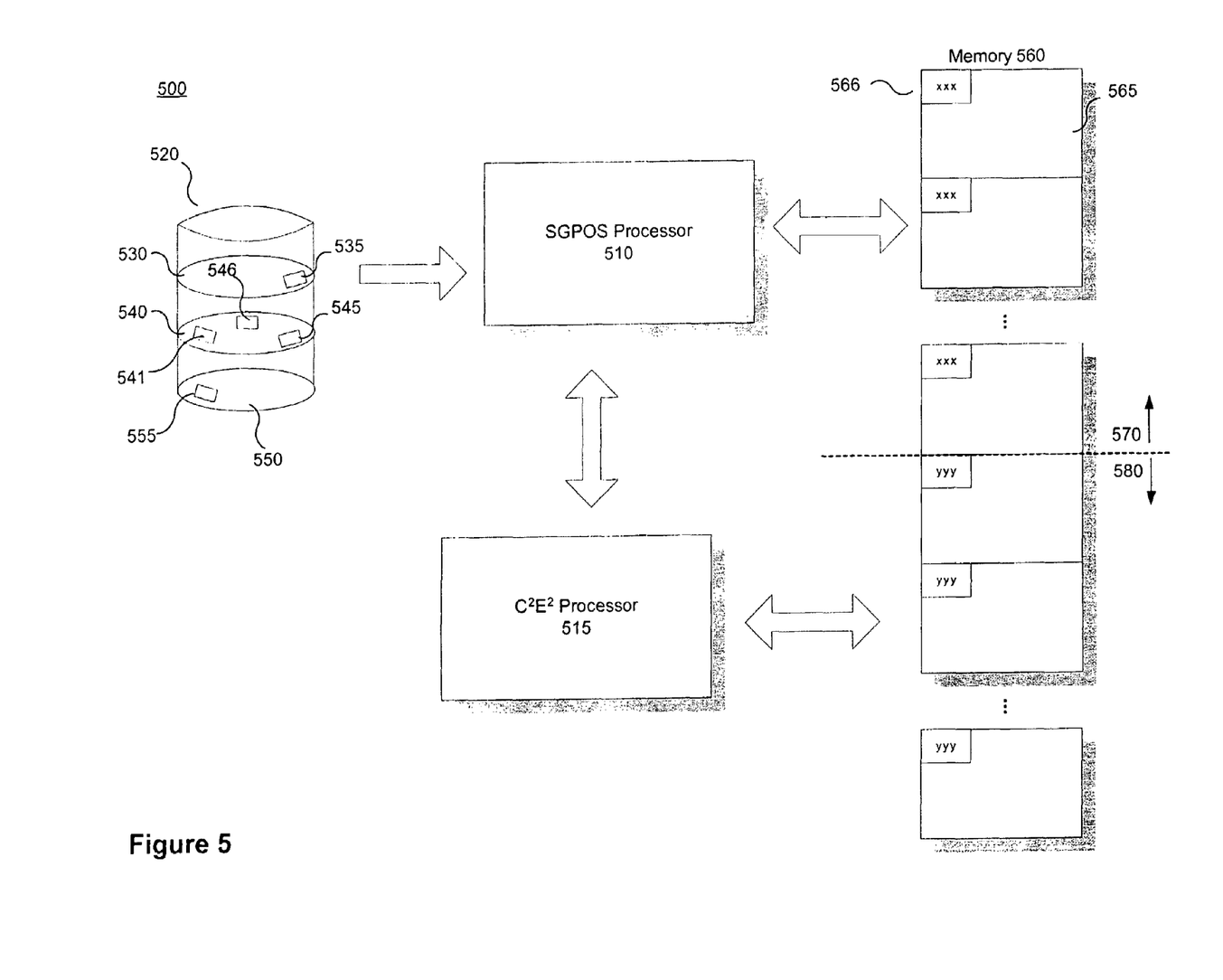
FIG. 5 is a simplified block diagram conceptually illustrating SGPOS boot processing and $C^2E^2$ initialization according to one embodiment of the present invention.

FIG. 5 is a simplified block diagram conceptually illustrating SGPOS boot processing and $C^2E^2$ initialization according to one embodiment of the present invention. In this simplified view of a multiprocessor server 500, only two processors (i.e., SGPOS processor 510 and $C^2E^2$ processor 515), a mass storage device 520, such as an internal hard drive, and memory 560 are shown.

In this example, the mass storage device 520 stores instructions and data for at least one SGPOS 540, at least one customized application 530, and at least one $C^2E^2$ 550 that implements a computational and/or I/O structure that is tuned for the customized application 530 and takes advantage of certain processor or other system resource features that are not exploited by the SGPOS 540. The mass storage device 520 also stores digital signatures 545 and 546 for the SGPOS loader and the SGPOS images, a digital signature 535 for the customized application 530, a digital signature 555 for the $C^2E^2$ 550, and an optional initialization file or partition descriptor 541 for communicating to the SGPOS 540 information about the existence and system resource requirements of $C^2E^2$ 550 and providing information regarding partition configuration.

The SGPOS processor 510 and $C^2E^2$ processor 515 may use the same operating system image or boot independently (e.g., separately load an operating system loader program and the same or different operating system images as well as verify digital signatures 545 and 546 for the SGPOS loader and SGPOS images). One processor, the SGPOS processor 510, may remain under the full control of the SGPOS 540 and the other processor, the $C^2E^2$ processor 515, may be placed under the full control of the $C^2E^2$ 550. As described earlier, the SGPOS 540 and $C^2E^2$ will typically each isolate their respective system resource partitions, including, for example, memory ranges 570 and 580, using hardware isolation. For example, memory 560 is represented as a number of pages (e.g., memory page 565). Various advanced memory protection architectures provide isolation mechanisms, such as region identifiers, protection identifiers, and memory page access rights. An appropriate identifier value 566 may be associated with a memory page to assign it to a particular system resource partition. Such identifier values may be directly incorporated as fields within the data structures that describe the virtual mappings to the memory pages, as well as recorded in associated memory control data structures.

While in this example images are loaded from a local storage device, in alternative embodiments, such as in an environment in which a computer system is booted over a network (e.g., an IP network) without access to an internal hard disk, it is contemplated that one or more of the images could be provided via communications ports from one or more network accessible storage devices.

Figure 6A:
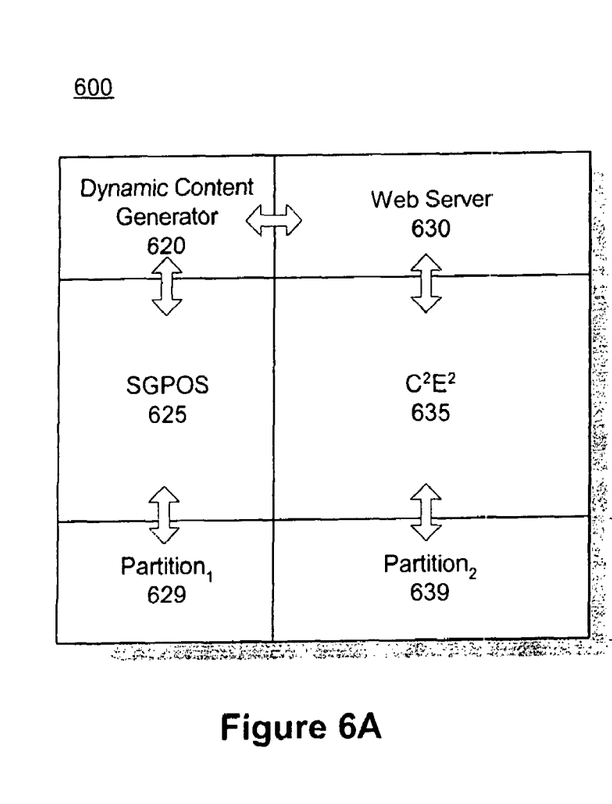
FIG. 6A conceptually illustrates a computer system configured to provide secure web server functionality according to one embodiment of the present invention in which the SGPOS retains control of a partition of system resources.

FIG. 6A conceptually illustrates a computer system 600 configured to provide a secure high-performance processing environment for a web server according to one embodiment of the present invention in which the SGPOS 625 retains control of a partition 629 of system resources. The system configuration depicted is illustrative of an exemplary multi-partition configuration that is supported by the existence of appropriate hardware-based isolation features in the processor, associated chipset or an intermediate interface, such as the secure-platform interface discussed above, interposed between the operating environments (e.g., the operating system and $CE^2(s)$) and the system resources. Until such isolation features are widely available, platform hardware partitioning or a more typical single-partition configuration, such as that illustrated in FIG. 6B, is expected to be the configuration of choice for secure systems.

At any rate, returning to the present example, the computer system 600 is conceptually illustrated after allocation of its system resources 610 (in accordance with the processing described with reference to FIG. 4 and FIG. 5, for example) between partition 629 associated with SGPOS 625 which provides services to a dynamic content generator 620, and partition 639 associated with $CE^2$ 635, which provides services to a secure web server 630. As noted above, because the $CE^2$ 635 is not limited to the portability constraints imposed on the SGPOS 625 and general-purpose operating systems as a whole, it can implement a computational and/or I/O structure that are simplified and optimized for the particular underlying hardware platform (e.g., one or more Intel Itanium 2 processors and associated chipsets) and/or a particular customized application (e.g., a secure proxy server or a secure web server 630).

The present example illustrates one possible system configuration, which when employing future hardware isolation capabilities or current hardware platform partitioning, allows web server security and performance to be enhanced while maintaining the ability to run other customer applications by supporting the concurrent and cooperative execution of a resident operating system, the SGPOS 625, and an operating environment, the $CE^2$ 635, that is separate from the resident operating system.

Figure 6B:
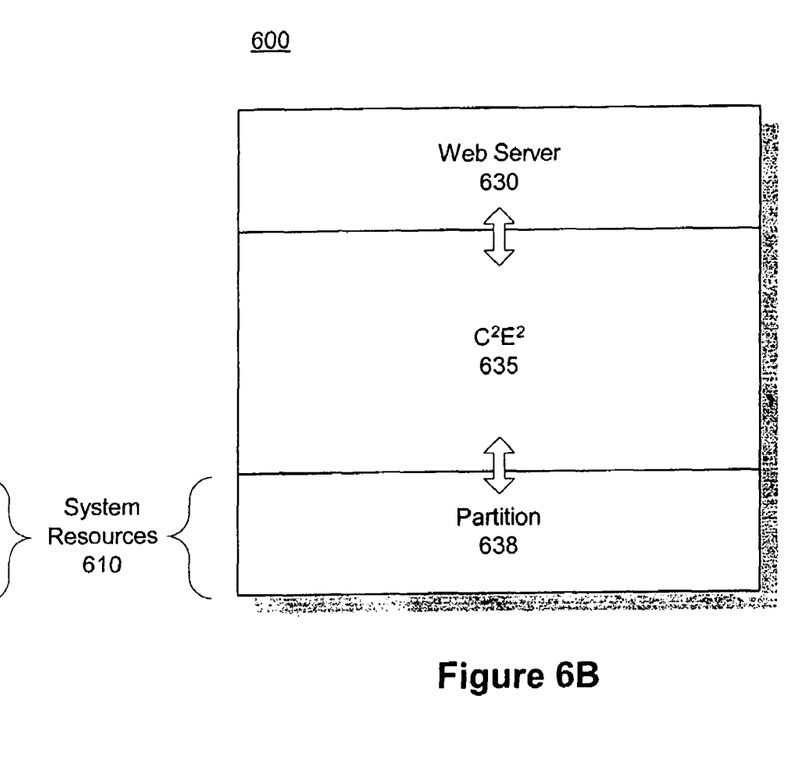
FIG. 6B conceptually illustrates a computer system configured to provide secure web server functionality according to an alternative embodiment of the present invention in which the SGPOS is placed in a dormant state and surrenders complete control of system resources to a $CE^2$.

FIG. 6B conceptually illustrates a computer system 600 configured to provide a secure high-performance processing environment for a web server 630 according to an alternative embodiment of the present invention. The system configuration depicted is illustrative of a possible system configuration in which the resident operating system, after initializing and launching the $CE^2$ 635, surrenders complete control of all or substantially all of the system resources 611 to the $CE^2$ 635 and is then placed in a dormant state from which it can be revived upon release of the system resources 611 by the $CE^2$ 635. Either hardware platform partitioning or a system configuration in which the SGPOS 625 is quiesced and full control of all or substantially all of the system resources 611 is placed in one or more $CE^2$s, are expected to be the predominate configurations until the anticipated hardware-based isolation features are both available and achieve industry acceptance. To the extent isolation is desirable within and/or between $CE^2$ partitions, current or future advanced memory protection architectures, such as region identifiers, protection identifiers, and memory page access rights, may be used as discussed above.

Problems Solved

The ability of a SGPOS to initialize, support, and/or coexist with one or more $CE^2$s solves many problems faced by applications with objectives that could benefit from use of the full capabilities of a particular hardware platform—such as a web engine's goals of minimum computational overhead, maximum performance, and strongest security. Specifically, a $CE^2$ is not limited by the same portability constraints as a principal general-purpose operating system. It also does not require the full generality of an operating system, and normally would be significantly simpler and smaller than an operating system. Not necessarily having to be portable, it fully can utilize unique hardware capabilities, can design a scheduling and I/O structure tuned for a particular application, and can reduce computational overheads only to those essential for a targeted, customized application. Greater simplicity is well recognized as an advantage for the design of a secure system.

Further, customized execution environments need not duplicate general-purpose capabilities already present in the SGPOS, but may focus solely upon the software structure best suited to their specific applications while obtaining general-purpose services from the SGPOS.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
providing a computer-readable medium encoded with instructions that implement one or more customized execution environments, each customized execution environment providing an execution environment for a single application and exclusively managing a subset of hardware resources of a computer system, with no operating system abstractions or interfaces interposed between the customized execution environment and the subset of hardware resources;
determining which hardware resources of the computer system are to remain under control of a resident operating system executing within the computer system and which of the hardware resources of the computer system constitute each subset of hardware resources of the computer system managed exclusively by one of the one or more customized execution environments; and
partitioning the hardware resources among the resident operating system and the one or more customized execution environments by associating one or more partitions of the hardware resources with the one or more customized execution environments.

2. The method of claim 1, wherein said partitioning the hardware resources comprises the resident operating system configuring the one or more partitions using hardware-based isolation features provided by one or more processors of the computer system.

3. The method of claim 2, further comprising the resident operating system entering a dormant state.

4. The method of claim 1, wherein said partitioning the hardware resources comprises the operating system configuring the one or more partitions using a secure-plafform interface.

5. The method of claim 4, further comprising the resident operating system retaining full control of one or more of the partitions and remaining active after said partitioning the hardware resources.

6. The method of claim 1, wherein said partitioning the hardware resources comprises a system administrator configuring the one or more partitions using hardware partitioning capability by the computer system.

7. The method of claim 6, further comprising separately booting the resident operating system and the one or more customized execution environments within their respective configured partitions.

8. The method of claim 1, further comprising a customized execution environment of the one or more customized execution environments making use of capabilities of the computer system not supported by the resident operating system.

9. The method of claim 1, wherein a customized execution environment of the one or more customized execution environments comprises both statically linked system code and data modules and application code and data modules.

10. The method of claim 1, wherein functional capabilities of a customized execution environment of the one or more customized execution environments is strictly limited to only those services required by a small set of predetermined applications.

11. The method of claim 1, where in an application within a customized execution environment of the one or more customized execution environments is limited to a single thread of execution in a processor controlled by the $CE^2$.

12. The method of claim 1, wherein a customized execution environment of the one or more customized execution environments utilizes hardware capabilities not supported by the resident operating system.

13. The method of claim 1, wherein services provided to an application within a customized execution environment of the one or more customized execution environments enable the application to recover and continue from a system error.

14. The method of claim 1, wherein a customized execution environment of the one or more customized execution environments is non-portable.

15. The method of claim 1, wherein services provided to an application within a customized execution environment of the one or more customized execution environments utilize no general-purpose operating system abstractions.

16. The method of claim 1, wherein services within a customized execution environment employ entirely different resource management strategies than those used by a general-purpose operating system.

17. A method comprising
providing a computer-readable medium encoded with instructions that implement a customized execution environment, the customized execution environment providing an execution environment for a single application, and exclusively managing a subset of hardware resources of a computer system, with no operating system abstractions or interfaces interposed between the customized execution environment and the subset of hardware resources;
partitioning, by an operating system executing within the computer system, the hardware resources of the computer system, including one or more processors and one or more ranges of physical memory, by
determining which of the hardware resources are to remain under control of the operating system and which of the hardware resources are to be placed within the subset of hardware resources exclusively managed by the customized execution environment
associating a first partition of the hardware resources with the customized execution environment; and
the operating system surrendering full control of the first partition of the hardware resources to the customized execution environment.

18. The method of claim 17, wherein the information regarding a customized execution environment includes a directive to partition hardware resources and an associated partition descriptor, the partition descriptor identifying hardware resources needed by the customized execution environment and indicating how partitions are to be configured.

19. The method of claim 17, wherein said associating a first partition of the hardware resources with the customized execution environment comprises disassociating those of the hardware resources in the first partition from the operating system and reconfiguring interrupts.

20. The method of claim 17, further comprising:
the operating system retaining full control of a second partition of the hardware resources; and
isolating the second partition of the hardware resources to protect the hardware resources associated with the operating system from the customized execution environment by employing hardware isolation.

21. The method of claim 20, further comprising isolating the first partition of the hardware resources to protect the hardware resources associated with the customized execution environment from the operating system by employing hardware isolation.

22. The method of claim 20, wherein the hardware isolation comprises establishing one or more disjoint sets of protection keys for one or more operations on one or more ranges of virtually addressed memory in the first or second partitions of the hardware resources.

23. The method of claim 20, wherein the hardware isolation comprises establishing one or more disjoint sets of region identifiers for one or more operations on one or more ranges of virtually addressed memory in the first or second partitions of the hardware resources.

24. The method of claim 20, wherein the hardware isolation comprises associating one or more ranges of memory in the second partition of the hardware resources with a processor in the second partition, and associating one or more ranges of memory in the first partition of the hardware resources with a processor in the first partition.

25. The method of claim 24, wherein said associating one or more ranges of memory in the second partition of the hardware resources with a processor in the second partition, and said associating one or more ranges of memory in the first partition of the hardware resources with a processor in the first partition, comprises employing a region-identifier-based memory partitioning mechanism.

26. The method of claim 17, further comprising:
receiving an indication that the customized execution environments is terminating; and
the operating system assuming control of the first partition of the hardware resources.

27. A system comprising:
a computer-readable medium encoded with instructions that implement a resident operating system and one or more customized execution environments, each customized execution environment providing an execution environment for a single application, and exclusively managing a subset of hardware resources of a computer system, with no operating system abstractions or interfaces interposed between the customized execution environment and the subset of hardware resources;
one or more processors, coupled to the one or more storage devices, that execute the resident operating system and the customized control environment, where:
a determination is made with respect to which portion of hardware resources of the system, including the one or more processors and memory of the system, are to remain under control of the resident operating system and which portion of the hardware resources are to be placed under control of the one or more customized execution environments; and
the hardware resources are partitioned among the resident operating system and the one or more customized execution environments by associating one or more portions of the hardware resources with the one or more customized execution environments.

28. A server comprising:
- a computer-readable medium encoded with instructions that implement a resident operating system and one or more concurrent customized execution environments, each customized execution environment providing an execution environment for a single application, and exclusively managing a subset of hardware resources of a computer system, with no operating system abstractions or interfaces interposed between the customized execution environment and the subset of hardware resources, the resident operating system capable of establishing a first partition of hardware resources for use and control by the operating system and a second partition of hardware resources for use and control by the concurrent customized execution environments;
- one or more storage devices having stored thereon software images of an operating system and customized control environment and services associated with a concurrent custom execution environment, the operating system capable of establishing a first partition of resources for use and control by the operating system and a second partition of resources for use and control by the $C^2E^2$;
- one or more processors, coupled to the computer-readable medium, that execute the resident operating system, where:
- a first portion of one or more storage devices, a first portion of the one or more processors, a first portion of memory, and a first portion of one or more input/output (I/O) devices are associated with the first partition by the operating system;
- a second portion of one or more storage devices, a second portion of the one or more processors, a second portion of the memory, and a second portion of the one or more input/output (I/O) devices are associated with the second partition by the resident operating system;
- the first partition is isolated to protect the hardware resources associated with the resident operating system from the concurrent custom execution environment by employing hardware-based security measures; and
- full control of the second partition is surrendered to the concurrent custom execution environment by the resident operating system initializing and invoking the customized control environment and services in the second portion of memory.

29. The server of claim 28, wherein the second partition is isolated to protect the hardware resources associated with the concurrent custom execution environment from the resident operating system by employing hardware-based security measures.

30. The server of claim 28, wherein the customized control environment and services are non-portable.

31. The server of claim 28, wherein the first partition includes at least one processor.

32. The server of claim 28, wherein the second partition includes at least one processor.

33. The server of claim 28, wherein the one or more storage devices have stored thereon a software image of a customized application for which a computational structure of the customized control environment and services has been tuned.

34. The server of claim 33, wherein the customized application comprises a web edge engine.

35. The server of claim 34, wherein the web edge engine comprises a web server.

36. The server of claim 34, wherein the web edge engine comprises an application server.

37. The server of claim 34, wherein the web edge engine comprises a communication server.

38. The server of claim 28, wherein a communication channel is maintained between the first partition and the second partition, and wherein a dynamic content generator executes within the first partition and provides dynamic content to the web server via the communication channel.

39. The server of claim 28, wherein the hardware-based security measures comprise use of one or more of region identifiers, protection identifiers, and memory page access rights values.

40. A computer-readable medium having an operating system stored thereon, the operating system comprising:
- a means for partitioning hardware resources into a least a first partition to remain under the control of the operating system, which executes within a computer system, and a second partition that is to be placed under the full control of a concurrent custom execution environment, the concurrent customized execution environment providing an execution environment for a single application, and exclusively managing a subset of hardware resources of the computer system, with no operating system abstractions or interfaces interposed between the customized execution environment and the subset of hardware resources;
- an interface means to hardware-based isolation features for protecting the hardware resources of the first partition against access by the concurrent custom execution environment;
- a means for transferring full control of the hardware resources of the second partition to the concurrent custom execution environment, including initializing and invoking customized control and services associated with the concurrent custom execution environment; and
- a means for providing communication between the first partition and the second partition.

41. The operating system of claim 40, further comprising a means for reincorporating partitioned hardware resources.

42. The operating system of claim 40, further comprising:
- separate means for operator control of the operating system and the concurrent custom execution environment; and
- separate interface means for monitoring the operating system and the concurrent custom execution environment.

43. A computer-readable medium having an operating system stored thereon, the operating system comprising:
- a means for communicating with one or more concurrent custom execution environments operating within and controlling respective hardware-enforced partitions of hardware resources separate from a hardware-enforced partition of hardware resources in which the operating system resides, the concurrent customized execution environment providing an execution environment for a single application, and exclusively managing a subset of hardware resources of a computer system, with no operating system abstractions or interfaces interposed between the customized execution environment and the subset of hardware resources; and
- a means for causing a concurrent custom execution environment of the one or more concurrent custom execution environment to begin processing or to terminate.

* * * * *